Nov. 28, 1961  H. G. CUTFORTH  3,010,355
METHOD FOR MAKING A ROCKET MOTOR
Filed June 10, 1957  2 Sheets-Sheet 1

INVENTOR.
H. G. CUTFORTH
BY Hudson & Young
ATTORNEYS

Nov. 28, 1961     H. G. CUTFORTH     3,010,355
METHOD FOR MAKING A ROCKET MOTOR
Filed June 10, 1957     2 Sheets-Sheet 2

INVENTOR.
H. G. CUTFORTH

BY Hudson & Young

ATTORNEYS

United States Patent Office 3,010,355
Patented Nov. 28, 1961

3,010,355
METHOD FOR MAKING A ROCKET MOTOR
Howard G. Cutforth, Bartlesville, Okla., assignor to Phillips Petroleum Company, a corporation of Delaware
Filed June 10, 1957, Ser. No. 664,844
1 Claim. (Cl. 86—1)

This invention relates to rocket motors. More particularly, it relates to a rocket motor charged with a solid propellant grain held under compression by the casing of the rocket motor. In another aspect it relates to a method for manufacturing such rocket motors.

Rocket motors, such as the type with which this invention is concerned, generally comprise a cylindrical casing defining a combustion chamber loaded or charged with a solid rocket propellant grain which, upon ignition and burning, generates large volumes of gases at high pressures and temperatures. These gaseous products are discharged from the combution chamber at high velocity through a nozzle located at the rear or aft end of the chamber, thus developing propulsive thrust which propels the rocket motor forward.

The solid propellant material from which rocket grains are fabricated often comprise a solid fuel and a solid oxidant for oxidizing the fuel. Ammonium nitrate and ammonium perchlorate are suitable oxidants, whereas the fuel component can generally be hydrocarbon material which serves as a binder for bonding the solid oxidant particles into a solid grain, as well as acting as a fuel. Material suitable for use as a binder include asphalt, rubber, and other tacky hydrocarbon-containing materials.

Rocket grains of propellant material are cast or extruded often in cylindrical form and the grains are charged or loaded into cylindrical rocket motor casings. In some type of rocket motors, such as those employed for assisting the take-off of aircraft, outer cylindrical surfaces of the grains are often bonded or otherwise secured to the inner wall of the rocket motor casing. During storage or transportation of these charged rocket motors, or when they are subjected to temperature-cycling between —70° F. and +170° F. according to military specifications, the grains often undergo volume changes due to crystal modification or mere thermal expansion or contraction, or both, induced by changes in ambient temperature. This is especially true of rocket motors charged with grains comprising an oxidant and binder wherein the oxidant is ammonium nitrate, it being a well known fact that ammonium nitrate undergoes crystal modifications on storage when changes in temperature occur. These changes in crystal structure often cause a reduction of the strength of the particles and are accompanied by measurable changes in volume. As such, rocket grains made of this type of propellant material often tend to pull away from the rocket motor casing and often cracking or breaking of the grain occurs because of the tensile stress developed. This cracking tends to undesirably expose certain surfaces of the grain, on which surfaces uncontrolled burning may result with the consequent build-up of pressure within the combustion chamber of the rocket motor at a deleteriously excessive rate. The accelerated and uncontrolled combustion thereby resulting generates gas at an undue pressure build-up for a time shorter than that required for the necessary degree of maximum thrust. In the case of ammonium nitrate, ambient low temperatures may cause a large contraction of the rocket grain. High temperatures may also cause some volume changes but this presents a lesser problem due to the greater strength exhibited by such grains when subjected to the compression of the surrounding rocket motor casing.

Accordingly, an object of my invention is to provide an improved rocket motor. A further object is to provide a rocket motor charged or loaded with a solid propellant grain, such as axially-perforated grain, held under compression, such rocket motor having application, for example, in assisting the take-off of aircraft. Another object is to provide a charged rocket motor characterized by the reduced tendency of the grain to pull away from the casing during temperature changes. A further object is to provide a method of manufacturing propellant charged rocket motors. Further objects and advantages of my invention will become apparent from the following discussion, appended claim, and the accompanying drawing in which:

Broadly contemplated, the rocket motors of my invention are manufactured as follows: A malleable tube or casing, such as an aluminum or aluminum alloy tube, is loaded or charged with a cylindrical propellant grain made of material susceptible to temperature-induced volume changes. These volume changes can be due to crystal modifications, as in the case where ammonium nitrate is used, or due to mere thermal expansion or contraction, as in the case where cordite is used, or both. The grain can have an axial perforation in which a suitable mandrel can be inserted to internally support the grain. The grain-loaded tube or casing is then reduced in diameter by passing the same through suitable rollers, dies, or the like, the grain being concomitantly reduced in diameter. Upon completion of the reduction operation, the reduced casing holds the grain under compression, the degree of compression being such as to to compensate for any volume reductions of the grain (e.g., between —70° F. and +170° F.) which would tend to pull the outer cylindrical surface of the grain from the inner wall of the casing. At this point, the grain-loaded casing can be cut and otherwise finished to form a loaded rocket motor in its assembled condition. In this type of rocket system the propellant grain is an integral part of the rocket motor.

Figure 1:
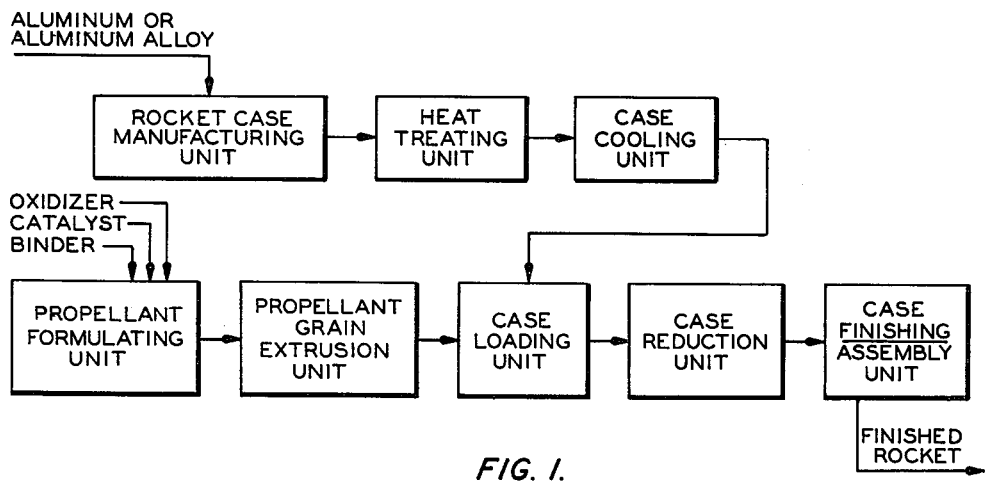
FIGURE 1 is a block diagram showing main steps for a method of manufacturing a rocket motor in accordance with my invention.

The principal manufacturing steps followed in the making of my novel grain-charged rocket motor are set forth in the block flow diagram shown in FIGURE 1. Reference will now be made to that figure in conjunction with the other figures for a description of my invention.

Figure 2:
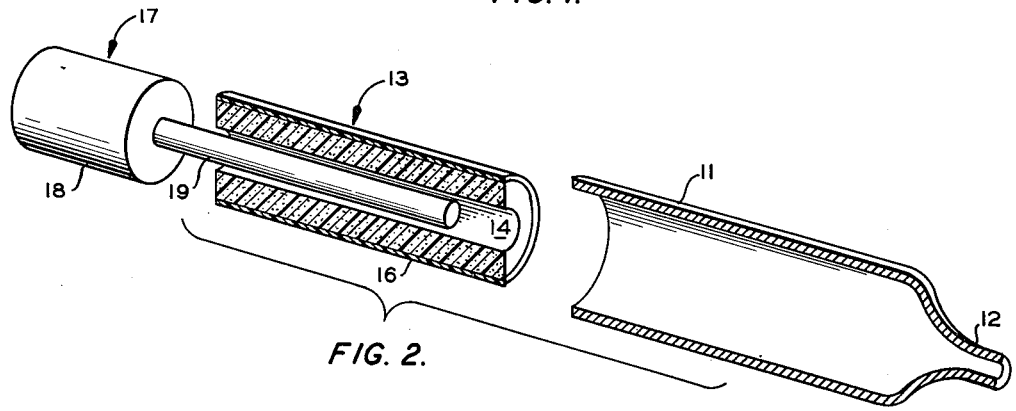
FIGURES 2 to 5 are views showing a rocket motor in various stages of its manufacture according to my invention.
Figure 3:
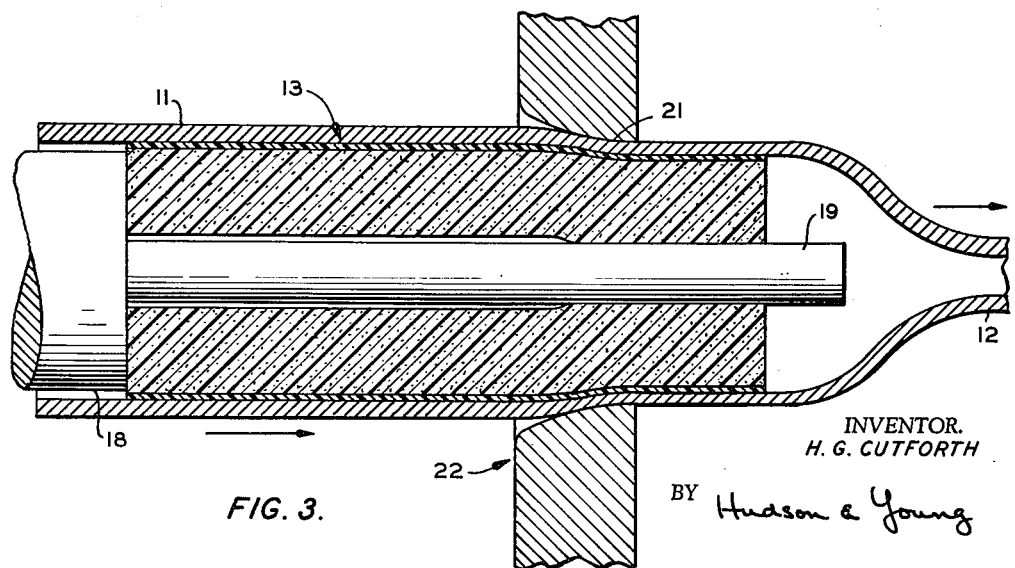
Figure 4:
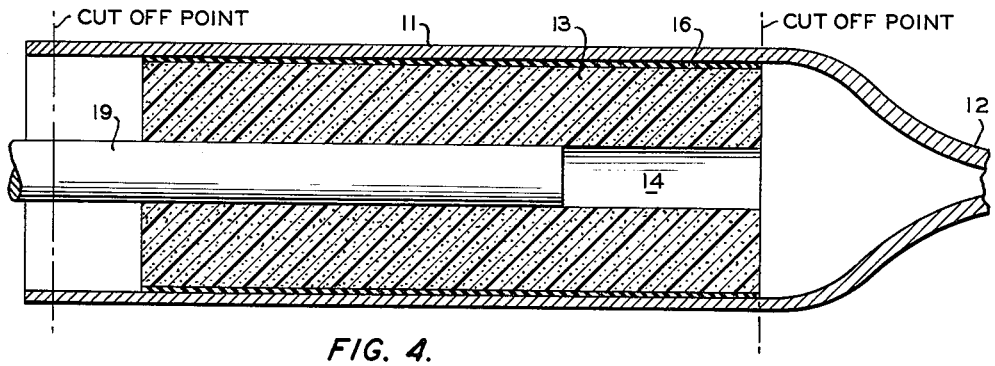

Referring first to FIGURE 2, tubing 11, which in its finished form will be the rocket motor casing, has a pointed end portion 12 which can be inserted through a die and caught by the jaws of suitable drawing apparatus such as that used in the metal fabricating art. This tubing is malleable, made for example from aluminum or aluminum alloy. A solid cylindrical rocket grain made of propellant material is generally designated 13. This grain can have an axial perforation 14, as shown, and can have its outer cylindrical surface covered by a layer of adhesive or restricting material 16. Member generally designated 17 is provided with a head portion 18 which acts as a plunger and which can be provided with a stem or mandrel 19, as shown, where the grain employed has a perforation; mandrel 19 can have an outer diameter slightly smaller than the inner diameter of perforation 14. The mandrel 19 is initially inserted in perforation 14 and member 17 is adapted to push the grain 13 inside of the tubing 11; the inner diameter of the latter can be slightly larger than the outer diameter of grain 13. With the grain loaded in the tubing 11, the pointed head 12 is passed through an opening 21 in a suitable die generally designated 22, as shown in FIGURE 3. The pointed head 12 is grasped by the jaws of suitable drawing equipment and the charged tubing 11 is pulled through the opening 21. The outer diameter of the tubing 11 is progressively reduced in size, as shown, and the outer diameter of the grain 13 is concomitantly reduced in size. The diameter of perforation 14 may also reduce in size, depending on the diameter of mandrel 19, the amount of compressive force, the nature of the propellant material, etc. Upon being drawn completely through the opening 21 of the die 22, the grain-loaded tubing 11 will substantially take the shape such as illustrated in FIGURE 4.

Alternatively, the tubing 11 and its grain 13 can be reduced in size by suitable rollers or the like, which equipment is well known in the metal-working industry.

Figure 5:
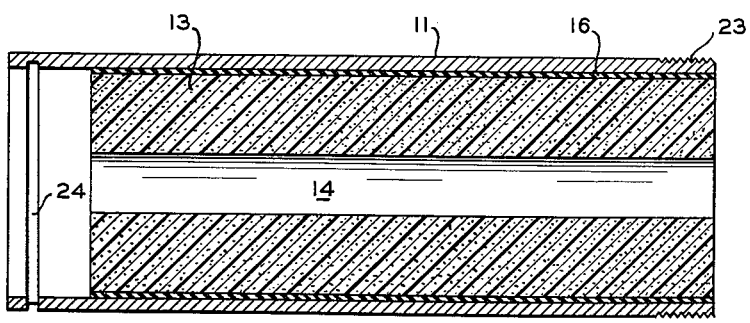

After the diameter of the tubing 11 is reduced by the amount desired, the grain-loaded tubing can be finished as follows. The mandrel 19, if employed, is withdrawn from the perforation 14 of the grain 13. The pointed head portion 12 can be cut off from the tubing 11 and the head portion of the tubing can be cut off with a certain length of tubing 11 left extending from the head of the grain 13, such as shown in FIGURE 5. The aft portion of the tubing 11 can be provided with suitable external threads 23, and the internal wall of the tubing 11 at its head end can be machined to provide a suitable keyway or groove 24, which is adapted to receive a segmented annular key or the like.

Figure 6:
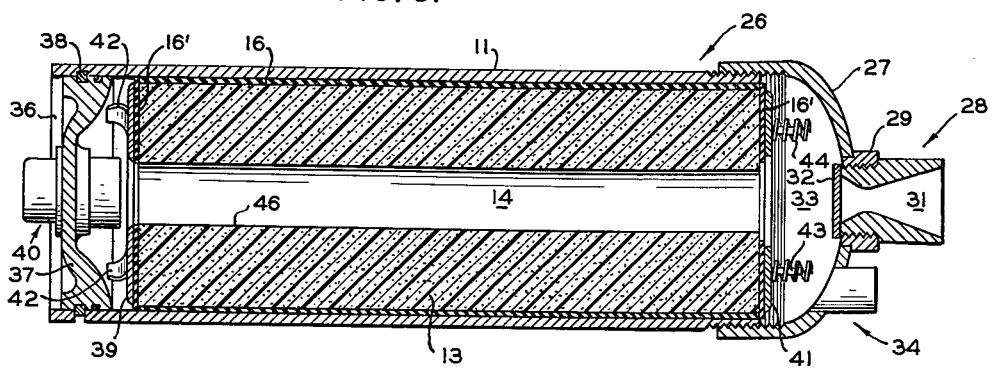
FIGURE 6 is an elevational view in partial section showing a finished rocket motor manufactured according to my invention.

Referring now to FIGURE 6, the rocket motor 26 is illustrated in its final finished form. This type of rocket motor represents one form of a jet propulsion motor which may be employed, for example, to assist the take-off of aircraft. Rocket motor 26 has an aft portion 27 which is threadedly connected to the aft end of the tubing 11. The aft portion 27 can be provided with a separate or integral nozzle generally designated 28, which is secured to the reduced aft portion by an annular lock member 29 or the like. The nozzle 28 has a Venturi-type passage 31, the inner end of which can be provided with a suitable obturating member or starter disk 32 which is adapted to burst when a suitable working pressure and temperature are reached in the combustion chamber 33 of the rocket motor 26. The reduced aft portion 27 can also be provided with a safety plug attachment generally designated 34 which is capable of releasing excessive pressure from the combustion chamber 33 in a manner well known to those skilled in the art. The other or head end of the rocket motor 26 is provided with a closure or cap member 36. Adjacent the interface of closure member 36 is a grain retaining member 37 which can be held in position by a suitable key 38. An igniter member generally designated 40 can be axially positioned in the head end of the rocket motor 26 and is preferably in axial alignment with the perforation 14 of grain 13.

Both ends of the grain 13 can be covered by restricting material 16′, in a manner similar to the outer cylindrical surface of the grain which is covered by a layer of restricting material 16. Retaining end plates 39, 41 are attached to the ends of the grain 13 adjacent the outer faces of the end restricting material 16′. The plates 39, 41 as well as the restricting material 16′ adjacent thereto have axial openings therein which are in alignment with the perforation 14. Secured to the head retaining plate 39 are outer-extending prongs or legs 42 which are adapted to register with the grain retaining assembly 37. The aft retaining plate 41 has secured to its outer surface a plurality of prongs 43 surrounded by compression springs 44 which are adapted to come into contact with the inside wall of the reduced aft portion 27.

Figure 7:
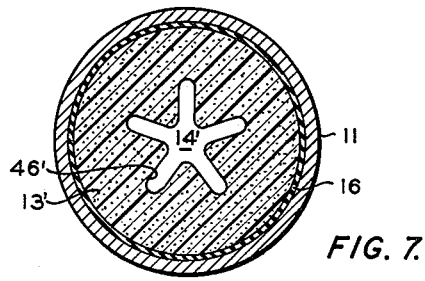
FIGURE 7 is an elevational cross-sectional view of rocket motor, such as that in FIGURE 6, illustrating the further embodiment of my invention.

The rocket grain 13, as shown, is of the internal-burning type by reason of its internal burning surface 46 which defines the axial perforation 14. As shown in FIGURE 6, the perforation 14 is cylindrical in shape. Alternatively, the perforation may be in the shape of a star as shown in FIGURE 7, or any other suitable configuration which will be determined, in part, by the desired operating characteristics of the rocket motor. Burning of these grains progresses from the burning surface 46 toward the combustion chamber wall.

Alternatively, the rocket grain held under compression by the combustion chamber wall, according to my invention, can be a solid cylindrical grain without an axial perforation. It can be restricted on its outer cylindrical surface as well as that end of the grain removed from the igniter, leaving one end exposed to serve as a burning surface. This is an end-burning type of grain, the burning of which progresses in the manner of a burning cigarette.

Any suitable malleable metal, such as low carbon steels or low alloy steels, or other material can be employed for fabricating the rocket motor casing, aluminum or aluminum alloys being preferred. The aluminum or aluminum alloys which can be employed in the process of this invention can be any of the commercial aluminums which can be heat treated and thereafter cold worked before the maximum hardness is developed by aging. Some examples of suitable trademarked aluminums are Duraluminum, 17S, A17S, B17S, 25S, 51S, C17S, and aluminum-silicon. The compositions of many of these alloys fall within the following tabulation.

Alloy compositions

| | |
|---|---|
| Copper | 2.5–4.5 weight percent. |
| Magnesium | 0.2–0.75 weight percent. |
| Manganese | 0.4–1.0 weight percent. |
| Aluminum | 92% minimum. |

Generally, these materials can be heat treated at a temperature between 910 and 1050° F. The method of heat treating these materials can be either solution heat treatment or heating in an air atmosphere in a furnace. Solution heat treatment is the preferred method, and this method of treatment is generally carried out by submerging the rocket motor casing in a bath of fused sodium nitrate. Immediately following the heat treatment, the hot rocket casing is cooled rapidly by quenching in either water or oil. At this point, the aluminum or aluminum alloy is in an amorphous or crystoplastic for which can be cold worked. After the casing is cool, the grain can be loaded therein.

The propellant material utilized in fabricating the rocket grains of this invention can be prepared from a variety of known compounding materials capable of deformation. The propellants can contain the ammonium, alkali metal, and alkaline earth metal salts of nitric, perchloric and chloric acids and mixtures thereof. Stabilized ammonium nitrate comprising a mixture of about 8 to 12 parts by weight of potassium nitrate and 95 to 85 parts by weight (preferably 92 to 88 parts by weight) of ammonium nitrate can also be employed as melts. In addition, the propellants can comprise cordite, ballistite double-base propellants such as a mixture of nitrocellulose and nitroglycerin, various oxidants dispersed in asphalt or polysulfide rubber binders, and the like.

Particularly useful propellant compositions which can be utilized in the practice of this invention are of the rubbery copolymer-oxidant type which are plasticized and worked to prepare an extrudable mass as 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant grains (either before or after insertion and compression in the casing) at temperatures in the range of 60 to 250° F., preferably about 190° F. In addition to the copolymer binder and other ingredients, the propellant composition comprises an oxidant and a burning rate catalyst. The resulting mixture is heated to effect curing of the same.

Solid propellant compositions particularly useful in the preparation of the propellants used in this invention can be prepared by mixing the copolymer with a solid oxidant, a burning rate catalyst, and various other compounding ingredients so that the reinforced binder forms a continuous phase and the oxidant a discontinuous phase. The resulting mixture can be heated to effect curing of the same.

The copolymers are preferable formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,2-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25, and may be masterbatched with 5-20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, is added to the carbon black slurry or to the water used to prepare the slurry.

The following empirical formulations or recipes generally represent the classes of binder and propellant compositions preferred for the preparation of the propellant grains of this invention.

Binder

| Ingredient: | Parts/100 parts rubber |
|---|---|
| Copolymer (Bd/MVP) | 100 |
| Philblack A (a furnace black) | 0–30 |
| Plasticizer | 10–30 |
| Silica | 0–20 |
| Metal oxide | 0–5 |
| Antioxidant | 0–5 |
| Wetting agent | 0–10 |
| Accelerator | 0–5 |
| Sulfur | 0–5 |

Propellant

| | |
|---|---|
| Oxidant (ammonium nitrate) | 10–25 weight percent. |
| Binder | 90–75 weight percent. |
| Burning rate catalyst | 0–30 parts/100 parts oxidant-binder. |

Suitable plasticizers useful in preparing these propellant grains include TP–90–B [Poly-(butoxy ethoxy ethoxy)methane] supplied by Thiokol Corp.; benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 65 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate), supplied by American Cyanamid Co. Satisfactory rubber cure accelerators include Philcure 113 (SA–113 N,N-dimethyl-S-tertiary butylsulfenyl dithiocarbamate), supplied by Phillips Petroleum Co.; butyl-8 (a dithiocarbamate-type rubber accelerator), supplied by R. T. Vanderbilt Co.; and GMF (quinone dioxime), supplied by Naugatuck Chemical Company. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori Blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like can also be used.

The layer of adhesive or restricting material can be made from any of the slow-burning materials used for this purpose for the rocket art, such as cellulose acetate, ethylcellulose, GRS, and preferably, a Bd/MVP copolymer. It should be understood that metal plates or the like can be used to restrict the ends of the grains, and the combustion chamber wall can serve to restrict the outer cylindrical surfaces of the grains. The restricting material can be cured at the same time the propellant is cured, or, if the propellant is cured prior to the loading of the casing, it can be cured after the compression step.

The diameter of the grain-loaded rocket casing is reduced until a definite compressive stress is imparted to the propellant grain. This stress may vary from a slight amount up to the compressive deformation limit. In one embodiment of the invention, the temperature of the grain is elevated to about 180° F. and the loaded casing is passed through rollers or dies so operated that the diameter of the casing is reduced to a point at which the compressive deformation limit of the propellant is reached. The amount of reduction in diameter will, of course, vary with the specific type of propellant material employed. As an example, a 90–10 butadiene-2-methyl-5-vinylpyridine bound propellant containing ammonium nitrate, Milori blue (catalyst), and various other compounding ingredients will deform approximately 10–25 percent under compression. Other propellant compositions are deformed to a greater or lesser extent when subjected to compressive load.

The rocket grain can be ignited by any suitable igniter now being used for this purpose in the rocket art. Preferably the igniter material employed is granular or pelleted and made from any suitable material generally employed for ignition purposes, e.g., black powder, and preferably an especially useful igniter material disclosed and claimed in the copending U.S. application Serial Number 592,995, filed June 21, 1956, by L. G. Herring. As disclosed in the latter-mentioned application, the igniter composition is formed of a plurality of discrete particles or pellets comprising powdered metal, powdered oxidizing material, and ethyl cellulose as a binding agent. This igniter material can be ignited by any suitable electro-responsive means such as fuses, matches, squibs, or the like, which are embedded or are in contact with the igniter material.

In the operation of the rocket motor shown in the drawing, upon closing a suitable switch, electric current flows through the fuses of the igniter 38, thereby igniting the igniter material in a well known manner. The igniter material in burning forms hot combustion gases which pass down the perforation 14 thereby igniting the burning surfaces 46 of the rocket grain 13. After a suitable working pressure is initially established for example, 200 to 1500 p.s.i., preferably between 600 and 1000 p.s.i., the starter disc 32, is ruptured, and the gases resulting from the combustion of the propellant material pass out through the Venturi passage 31, thereby imparting thrust to the rocket motor. Should this working pressure be exceeded, the safety plug attachment 34 is adapted to rupture and release excessive pressure.

EXAMPLE

In accordance with the present invention, a rocket motor is prepared by the following procedure.

A binder composition is prepared using a 90/10 butadiene/2-methyl-5-vinylpyridine copolymer, prepared by emulsion polymerization, and having a Mooney value (ML-4) of 20. This binder composition is prepared in accordance with the following formulation:

*Binder recipe*

| Ingredient: | Parts by weight |
|---|---|
| Butadiene/methylvinylpyridine copolymer | 100 |
| Carbon black | 22 |
| Di-(1,4,7-trioxaundecyl)methane | 20 |
| N,N,-dimethyl-S-tert-butylsulfenyl dithiocarbamate | 1 |
| Sulfur | 0.75 |
| Zinc oxide | 3 |
| Flexamine [1] | 3 |

[1] Physical mixture containing 25% by weight of a complex diarylamine-ketone reaction produce and 35% by weight of N,N'-diphenyl-p-phenylenediamine.

The above binder composition is then utilized in a propellant of the following composition.

*Propellant composition*

| Ingredient: | Parts by weight |
|---|---|
| Ammonium nitrate (40 micron particle size) | 82.5 |
| Binder | 17.5 |
| Milori blue | 2.0 |

The above propellant ingredients are admixed in a Baker-Perkins mixer until homogeneous. This propellant composition is then extruded into a propellant grain measuring 6 inches in diameter and 24 inches in length. The thus-formed grain is then cured for 24 hours at 180° F., after which the outer surface of the grain, excluding the end which will be subsequently adjacent the igniter, is coated by brushing on an adhesive composition comprising 37.8 parts by weight of castor oil, 36.9% by weight of 2-hydroxyethyl ricinoleate, and 25.3 parts by weight of toluene diisocyanate.

The coated grain is then slipped into a cylindrical aluminum alloy (4.0 weight percent copper, 0.5% manganese, 0.5% magnesium, remainder aluminum) case which has been previously solution heat treated at 950° F., followed by quenching. This cylinder has an inside diameter of 6⅛ inches, is ¼ inch thick, and has a length of 30 inches. The case containing the grain is then cured for 27 hours at 180° F. to set the bond between the grain and the case. The cylinder containing the propellant grain is then forced through a die so as to reduce the inside diameter of the metal cylinder to 5½ inches.

The necked portion of the aft end of the metal cylinder, and the head end of the cylinder are then trimmed off as shown in FIGURE 5. The aft end is then threaded to receive a closure device, nozzle and adapter as shown in FIGURES 5 and 6, and the rear end is notched to receive a key type closure as shown in FIGURES 5 and 6.

Various modifications and alterations of my invention will become apparent, to those skilled in the art, without departing from the scope and spirit of my invention; and it is to be understood that the foregoing discussion and accompanying drawing merely represents preferred embodiments of my invention and do not unduly limit the same.

I claim:

In a method for making a rocket motor, the steps comprising loading a cylindrical casing of malleable metal with a cured, cylindrical grain of propellant material, the latter comprising an oxidant and a binder and normally susceptible to temperature-induced volume changes, said grain having an axial perforation, internally supporting said axial perforation and subjecting the resulting grain-loaded casing solely to external compression applied to the outer cylindrical surface of said casing whereby the diameters of said casing and said grain are concomitantly reduced and a predetermined compressive stress is imparted to the latter, and whereby said grain is held by the adjacent casing in such a manner that the tendency of the contiguous surfaces to part due to temperature changes is minimized.

References Cited in the file of this patent

UNITED STATES PATENTS

| 826,293 | Unge | July 17, 1906 |
| 1,880,579 | Tiling | Oct. 4, 1932 |
| 2,828,537 | Pischke et al. | Apr. 1, 1958 |
| 2,887,504 | Fox | Mar. 17, 1959 |

FOREIGN PATENTS

| 622,217 | Great Britain | Apr. 28, 1949 |
| 746,214 | Great Britain | Mar. 14, 1956 |